United States Patent [19]

de Carbon

[11] Patent Number: 4,799,577
[45] Date of Patent: Jan. 24, 1989

[54] TELESCOPIC HYDRAULIC SHOCK ABSORBER WITH TEMPERATURE SENSITIVE WIRE TO CONTROL DAMPING

[76] Inventor: Christian B. de Carbon, 64 Boulevard Maurice Barrés, F-92200 Neuilly-sur-Seine, France

[21] Appl. No.: 15,294

[22] Filed: Feb. 17, 1987

[30] Foreign Application Priority Data

Feb. 18, 1986 [FR] France ............... 86 02188

[51] Int. Cl.$^4$ .................... F16F 9/52; F16F 9/46; G05D 15/00; F16K 31/00
[52] U.S. Cl. ................................ 188/277; 188/299; 236/68 R; 251/11
[58] Field of Search ............... 188/277, 278, 299, 313, 188/319, 316, 322.15, 322.22; 236/68 R, 68 B; 251/11; 280/707

[56] References Cited

U.S. PATENT DOCUMENTS

| | | | |
|---|---|---|---|
| 2,881,869 | 4/1959 | Yarrick | 188/277 |
| 2,899,023 | 8/1959 | Rumsey | 188/277 |
| 3,958,672 | 5/1976 | Keilholz | 188/277 |
| 4,372,486 | 2/1983 | Tomioka et al. | 251/11 X |
| 4,673,067 | 6/1987 | Munning et al. | 188/299 |
| 4,674,398 | 6/1987 | Taylor | 251/11 X |

FOREIGN PATENT DOCUMENTS

| | | | |
|---|---|---|---|
| 0609178 | 11/1960 | Canada | 188/277 |
| 0066154 | 12/1982 | European Pat. Off. | 188/277 |
| 2418390 | 9/1979 | France . | |

Primary Examiner—Andres Kashnikow
Assistant Examiner—Robert J. Oberleitner
Attorney, Agent, or Firm—Watson Cole Grindle & Watson

[57] ABSTRACT

A telescopic hydraulic shock absorber with controlled damping comprising a cylinder (1), within which a piston (6) connected to the end of a rod (7) can reciprocate, the piston having at least one restricted passage (12) interacting with an elastic flap (13), an additional passage (16, 17) capable of being closed to a greater or lesser extent by a remote-controlled shut-off (18), to allow the hydraulic fluid to pass from one side of the piston to the other during the movement of the latter within the cylinder, wherein the movement of the shut-off (18) is controlled via an actuating member (21) comprising an active element comprised of a metallic memorizing material capable of changing its size at a predetermined conversion temperature.

9 Claims, 3 Drawing Sheets

TELESCOPIC HYDRAULIC SHOCK ABSORBER WITH TEMPERATURE SENSITIVE WIRE TO CONTROL DAMPING

BACKGROUND OF THE INVENTION

Dampers used especially in the suspension of motor vehicles and for similar purposes have damping characteristics which are a compromise between the various objectives sought after, particularly comfort, stability, adhesion, etc. This compromise is the result of subjective assessments, because ideal damping varies depending on whether the same vehicle is used for relaxed motoring or sports driving. In the present state of the art, the compromise is arrived at empirically.

Moreover, the present tendency to produce lighter and lighter motor vehicles with suspensions of variable flexibility means that a single damping setting no longer meets the requirements of all the versions of one and the same vehicle model or all the motoring conditions and the drivers' wishes.

A hydraulic shock absorber of telescopic construction used especially in a motor-vehicle suspension, performs two functions: it brakes the movements of the suspended mass, in this particular case the body of the vehicle, and it controls the rebound of the wheels, these two phenomena giving rise to the main effects of resonance. The present invention relates mainly to the braking of the movements of the suspended mass, that is to say the body where a vehicle is concerned, this braking being ensured as a result of the low-speed damping rate of the suspension (up to approximately 0.2 m/sec., as measured vertically relative to the vehicle wheel). This part of the damping characteristic is mainly ensured conventionally, in a telescopic hydraulic shock absorber, by one or more permanent passages associated with a flap system. To modify the damping of such a hydraulic shock absorber, it is therefore sufficient to vary the cross-section of these permanent passages.

Telescopic hydraulic shock absorbers having an adjustment system capable of controlling the damping rate remotely are already known. In these shock absorbers of a known type, a means of shutting off the permanent passage in the flap system can be moved by means of a mechanical connection which connects the interior of the shock absorber to an actuation means located outside the shock absorber. Such an actuation means conventionally comprises a screw wheel or an electromagnetic device having a solenoid or alternatively an electric motor. Such devices can be used only under certain specific conditions. In particular, it is appropriate if a suitable space can be used outside the shock absorber to accommodate such a solenoid or such an electric motor. It is also expedient if a mechanical connection is possible between the shut-off means and the external actuation means.

SUMMARY OF THE INVENTION

It is an object of the present invention to provide a telescopic hydraulic shock absorber making it possible to obtain several damping rates with remote control, using means which do not project beyond the casing of the shock absorber and which function in an especially simple and reliable way.

The telescopic hydraulic shock absorber of the invention further has remote-controlled damping which allows manual control, for example by means of a switch located on the dashboard of the vehicle or an automatic control by the measurement of various operating parameters of the vehicle, such as lateral and longitudinal acceleration, speed, braking etc., and in which the various signals corresponding to these parameters can be processed in a suitable way in order to control the variation in the damping rate according to a predetermined program.

The telescopic hydraulic shock absorber with controlled damping according to the invention is of the type comprising a cylinder, within which a piston fastened to the end of a rod can move, the piston having at least one restricted passage interacting with an elastic flap and an additional passage which can be closed to a greater or lesser extent by a remote-controlled shut-off means, to allow the hydraulic fluid to pass from one side of the piston to the other during the movement of the latter within the cylinder. According to the invention, the movement of the shut-off means is controlled via an actuating member comprising an active element made of a metallic memorizing material capable of changing size at a particular conversion temperature. It is thus possible to obtain two or more positions of the shut-off means which govern the cross-section of the additional passage located in the piston of the shock absorber.

The metallic shape-memorizing material is usually an alloy based on titanium and nickel which changes its crystalline state at a given conversion temperature. Below the conversion temperature, the metal is easily malleable and can be brought to a predetermined position or size, for example as a result of the action of a spring. If the temperature of the memorizing metal is increased above its conversion temperature, the memorizing metal tends to return to the predetermined position, size or shape which it possessed at the time of production, and to achieve this the metal is capable of exerting a certain force. When the temperature is reduced below the conversion temperature, the metal becomes malleable again and can once more be brought to its predetermined position, size or shape, for example as a result of the action of a spring system. If certain precautions are taken, this sequence of operations can be repeated many times.

According to the present invention, the active element is preferably connected to an external electrical supply source, the passage of the electrical current through the active element causing it to be heated up as a result of the Joule effect.

Furthermore, the actuating member is preferably designed so that the control causes the shut-off means to move in the direction closing the additional passage, thus making the shock absorber more rigid.

The active element made of memorizing metal is preferably used in the form of a wire which changes length with its temperature. Such a wire is brought to a predetermined position, for example by a spring, at a temperature below its conversion temperature. It can resume the length memorized at the time of production when the temperature rises above the conversion temperature. The memorizing metal is heated by passing the electrical current through the wire. The heating of the wire with a relatively high current intensity causes a very rapid change in length. As an example, an intensity of approximately 20 amperes at 12 volts makes it possible to obtain an elongation of 3 to 5% in a very short time which can reach 1/10th of a second and even less. The temperature of the wire can subsequently be kept constant at a value above the conversion temperature of the memorizing metal by applying a markedly lower current intensity, for example by reducing the voltage used initially. The cooling of the memorizing wire is a longer operation which depends on the ambient conditions and can reach several seconds.

In the preferred embodiment of the invention, the rod of the shock absorber is hollow and the actuating member is accommodated in the hollow rod. The electrical wires required to cause the heating of the wire made of memorizing metal also pass through the hollow rod of the shock absorber. This results in an extremely compact structure, the entire control device being accommodated completely in the rod of the shock absorber.

BRIEF DESCRIPTION OF THE DRAWINGS

The invention will be clearly understood from the following detailed description of several embodiments of the invention taken as nonlimiting examples and illustrated in the accompanying drawings in which.

DETAILED DESCRIPTION OF THE INVENTION

The invention will now be described on the basis of an exemplary embodiment of a pressurized single-tube shock absorber illustrated in FIG. 1. This type of shock absorber presents a problem which is particularly difficult to solve when a solenoid or an electric motor is to be mounted on the outside in order to obtain a variable damping rate. In fact, in this type of shock absorber it is very difficult to ensure a reliable mechanical connection between the solenoid or external electric motor and the flap system located in the piston of the shock absorber. It will, of course, be appreciated that the invention can also apply to other types of telescopic hydraulic shock absorbers, especially to shock absorbers of the twin-tube type, in which only a part of the system of damping flaps is located in the piston. In shock absorbers of the twin-tube type, a foot flap is in fact mounted at the end of the cylinder on the blind side of the piston, to allow a restricted passage of the hydraulic fluid from the cylinder to a tank which, if appropriate, is pressurized by a gas and which is arranged concentrically about the cylinder.

Figure 1:
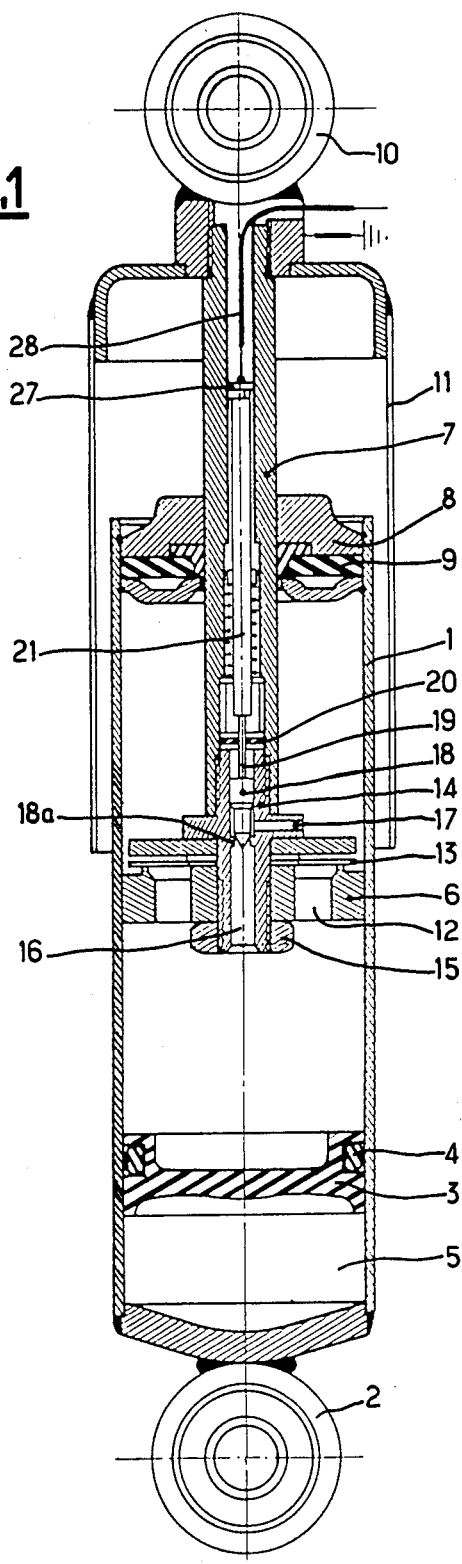
FIG. 1 is a diagrammatic sectional view of a telescopic hydraulic shock absorber with controlled damping of the pressurized single-tube type, having the means of varying the damping rate according to the invention.

As illustrated in FIG. 1, the single-tube telescopic hydraulic shock absorber comprises a cylinder 1 mounted at one of its ends by means of an eyelet 2. A free piston 3 equipped with an O-ring 4 separates the cylinder 1 into two portions. One portion 5 contains a pressurized gas and the other portion of the cylinder is filled with hydraulic fluid. A piston 6 is connected to the end of a rod 7, of which the movement in the cylinder 1 is guided by the guide 8 connected to the cylinder 1 and associated with a gasket 9. The outer end of the rod 7 is connected to a second mounting eyelet 10. The shock absorber has a protector 11 integral with the rod 7 and covering a part of the cylinder 1.

The piston 6 has permanent passages 12 interacting with a flap system 13. The rod 7 is hollow and at its inner end has an adapter 14 which is screwed into a central hole tapped in the piston 6 and which interacts with a nut 15. The adapter 14 has an axial passage 16 which communicates with the blind side of the piston 6 and one or more passages 17 arranged radially and in communication with the rod side of the piston 6. Mounted inside the adapter 14 is a valve 18 which is movable in an axial direction and which, in the closed position, blocks communication between the passages 16 and 17 by seating against its seat 18a. When the valve 18 is in the open position, the passages 16 and 17 communicate with one another.

Figure 2:
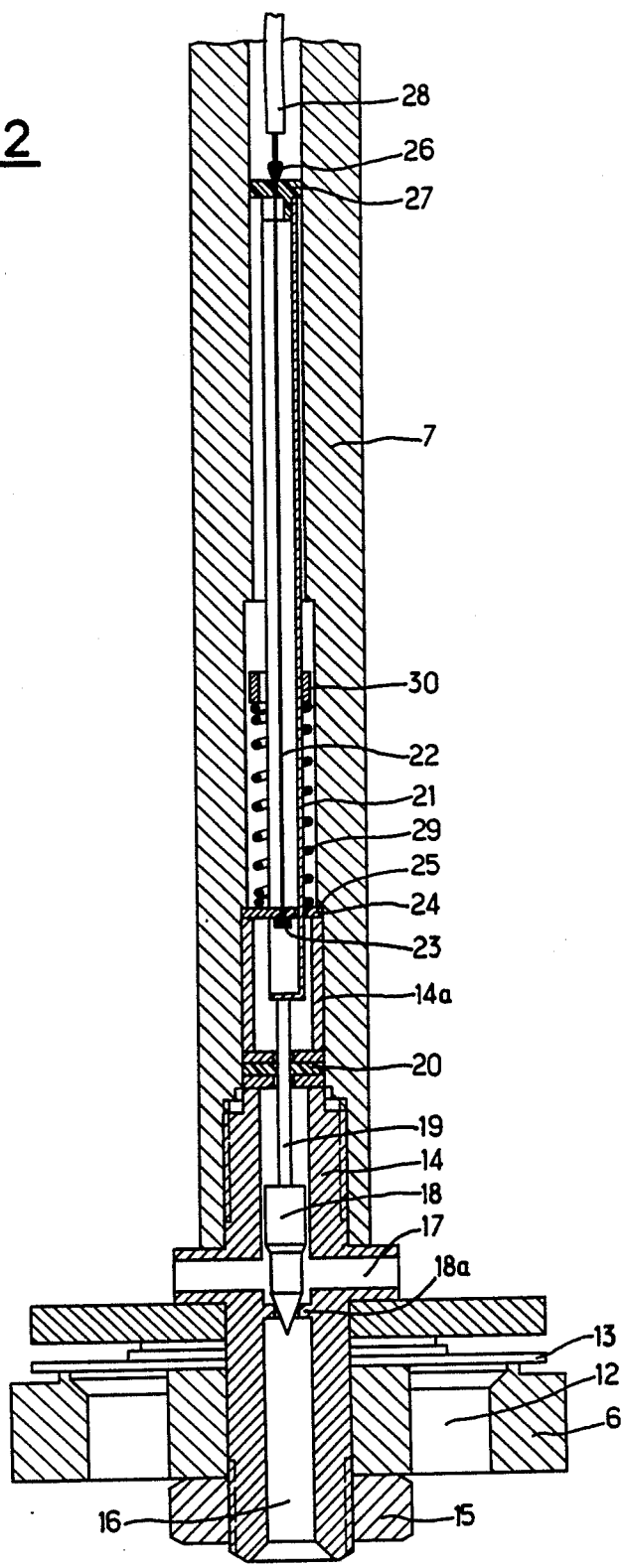
FIG. 2 is an enlarged sectional view of the rod and piston of the shock absorber of FIG. 1.

Reference will now be made to FIG. 2 in order to better understand the mode of operation of the assembly as a whole. As can be seen in FIG. 2, the valve 18 is fastened to an axial pusher rod 19 which extends through a gasket 20. The pusher rod 19 is attached to the body of an actuating member 21 which comprises a wire made of memorizing metal 22, arranged axially and held at one end 23 on a transverse metal plate 24 retained by means of a spacer bush 14a between the adapter 14 and a radial shoulder 25 located in the hollow rod 7. At its other end 26, the wire 22 is fastened against the body of the actuating member 21 by means of a plug 27 of an electrically insulating material. The memorizing wire 22 is supplied with electrical current (from a suitable source) via the flexible lead 28, and the electrical current is returned at the end 23 via the metal plate 24 in contact with the rod 7 which in turn is grounded.

The body of the actuating member 21 is elongated and U-shaped in cross-section, and is capable of extending through a U-shaped recess (not shown) located in the metal plate 24, so as to allow the latter to hold the memorizing wire 22 at its end 23, while at the same time permitting the actuating member 21 to move axially in the direction of the axis of the hollow rod 7. A spring 29 mounted between metal plate 24 and a stop 30 integral with the actuating member 21 ensures that the memorizing wire 22 always remains tensioned even during transport before the shock absorber is assembled. Below the conversion temperature of the memorizing metal of which the wire 22 is made, the force exerted by the spring 29 maintains the valve 18 in an open position, allowing the hydraulic fluid to circulate in the shock absorber from one side of the piston 6 to the other side via the passages 16 and 17. Above the conversion temperature of the memorizing metal, the memorizing wire 22 experiences a reduction in its length and consequently exerts a pull by means of its end 23 on the metal plate 24. Since the plate 24 is fixed, this pull results by reaction in a push on the plug 27 at the end 26 of the wire 22. The actuating member 21 consequently move axially, taking with it the pusher rod 19 and the valve 18 which block communication between the passages 16 and 17, thus preventing the hydraulic fluid from circulating in the shock absorber from one side of the piston 6 to the other via the passages 16 and 17. This device therefore provides two damping adjustment positions, depending on whether the memorizing wire 22 is supplied with electricity or not.

Figure 3:
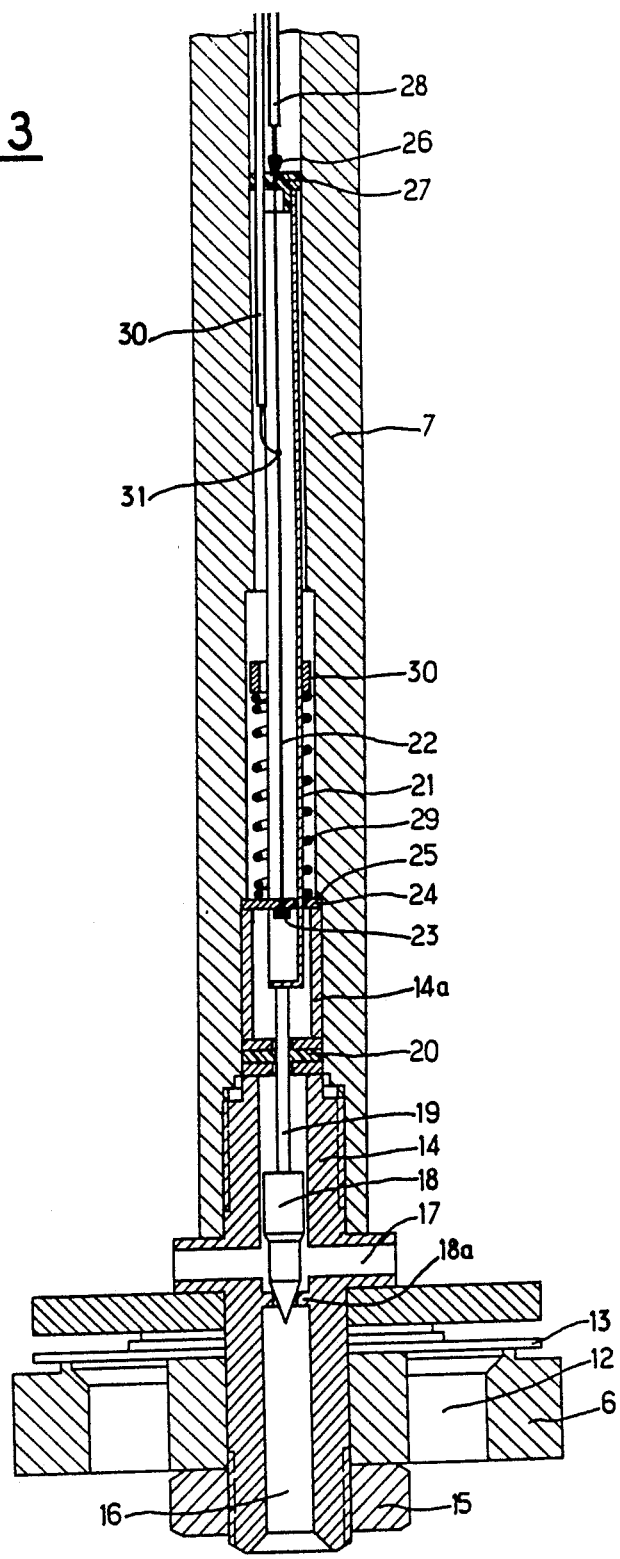
FIG. 3 is a sectional view similar to that of FIG. 2, showing an alternative embodiment.

FIG. 3, in which identical components bear the same references, illustrates an alternative embodiment. In this alternative form, a second flexible lead 30 supplying electrical current passes through the insulating plug 27 and is connected to the wire 22 at a point 31 along its length which, in the example illustrated, corresponds to approximately ⅓ of the length of the wire 22. By means of a suitable control, it is therefore possible to obtain, with this alternative form, four positions of the valve 18 corresponding to four different damping settings, depending on whether no portion at all, ⅓, ⅔ or the whole of the length of the memorizing wire 22 is supplied with electrical current.

The memorizing metal used in the actuating member of the present invention is selected from the various memorizing alloys of a known type, based mainly on titanium and nickel, for its mechanical, physical and electrical properties, in order to provide the force necessary for the intended number of operations. Moreover, the memorizing metal selected is such that its transition temperature makes it possible to obtain an acceptable hysteresis between the heating phase and the cooling phase and ensures a low operating time with a reduced consumption of electricity.

I claim:

1. A telescopic hydraulic shock absorber with controlled damping, comprising a cylinder containing a reciprocable piston connected to an end of a hollow piston rod, the piston having at least one restricted flow passage, an elastic flap on the piston for controlling the flow passage, the piston having a further flow passage, a remote-controlled axially movable shut-off means associated with the further passage for controlling the flow of hydraulic fluid to pass from one side of the piston to the other during piston movement, a pusher rod connected to said shut-off means, actuating means located within said hollow piston rod and connected to said pusher rod for controlling the axial movement thereof, said actuating means comprising an elongate member axially movable within said hollow piston rod and connected at one end to said pusher rod, a stop having an opening and being fixed to said piston rod, said actuating member extending through the stop opening, an elongated wire of metallic memorizing material and capable of changing the length thereof at a predetermined conversion temperature, one end of said wire being connected to said stop such that a change of length of said actuating member extending through the stop opening controls the shut-off means.

2. The shock absorber according to claim 1, wherein said actuating member has stop affixed thereto, and a return spring extends between said stops for returning the shut-off means to an initially open position.

3. A telescopic hydraulic shock absorber according to claim 1, wherein said shut-of means are normally open and further comprising means for elevating the temperature of the metallic wire to reduce the length thereof to provide closing of the shut-off means.

4. A telescopic hydraulic shock absorber according to claim 1, wherein said elongated wire is connected to an external electrical supply for passing electrical current through said elongated wire and causing it to be heated for changing the size thereof for controlling the movement of the shut-off means.

5. A telescopic hydraulic shock absorber according to claim 1, further comprising a freely movable piston within said cylinder separating a portion of said cylinder into a chamber containing a pressurized gas.

6. A telescopic hydraulic shock absorber with controlled damping, comprising a cylinder containing a reciprocable piston connected to an end of a hollow piston rod, the piston having at least one controlled restricted flow passage and a further flow passage, a remote-controlled axially movable shut-off means associated with the further passage for controlling the flow of hydraulic fluid to pass from one side of the piston to the other during piston movement, actuating means located within said hollow piston rod, said actuating means comprising an actuating body member and an elongated wire of metallic memorizing material connected to said actuating body member and extending axially within said hollow piston rod and capable of changing the length of said elongated wire at a predetermined conversion temperature such that said actuating means controls the movement of the shut-off means.

7. A telescopic hydraulic shock absorber according to claim 6, wherein said elongated wire is connected to an external electrical supply for passing electrical current through said elongated wire and causing it to be heated for changing the size thereof for controlling the movement of the shut-off means.

8. A telescopic hydraulic shock absorber according to claim 6, wherein said actuating means has a stop affixed thereto, and a return spring extends between said stops for returning the shut-off means to an initially open position.

9. A telescopic hydraulic shock absorber according to claim 6, further comprising a freely movable piston within said cylinder separating a portion of said cylinder into a chamber containing a pressurized gas.

* * * * *